United States Patent
Ishii

(10) Patent No.: US 8,830,905 B2
(45) Date of Patent: Sep. 9, 2014

(54) BASE STATION APPARATUS, MOBILE STATION APPARATUS, AND COMMUNICATIONS CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 322 days.

(21) Appl. No.: 12/672,874

(22) PCT Filed: Aug. 8, 2008

(86) PCT No.: PCT/JP2008/064366
§ 371 (c)(1),
(2), (4) Date: Apr. 21, 2010

(87) PCT Pub. No.: WO2009/022669
PCT Pub. Date: Feb. 19, 2009

(65) Prior Publication Data
US 2011/0128941 A1    Jun. 2, 2011

(30) Foreign Application Priority Data

Aug. 14, 2007    (JP) ................................ 2007-211589

(51) Int. Cl.
| | |
|---|---|
| H04W 4/00 | (2009.01) |
| H04J 3/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ............ 370/328; 370/232; 370/329; 370/336

(58) Field of Classification Search
None
See application file for complete search history.

(56) References Cited

U.S. PATENT DOCUMENTS

| | | | |
|---|---|---|---|
| 2009/0040928 A1* | 2/2009 | Wang et al. | 370/232 |
| 2009/0046627 A1* | 2/2009 | Xu | 370/328 |
| 2009/0190540 A1 | 7/2009 | Harada et al. | |

FOREIGN PATENT DOCUMENTS

| | | |
|---|---|---|
| CN | 101001157 A | 7/2007 |
| WO | 2007/052921 A1 | 5/2007 |
| WO | 2007/148706 A1 | 12/2007 |

OTHER PUBLICATIONS

NTT DoCoMo, et al., "Hybrid ARQ Scheme for E-UTRA Downlink," Feb. 17, 2006, 3GPP TSG-RAN WG1 Meeting #44, R1-060435, 4 pages.
Nokia, "Synchronous adaptive HARQ for E-UTRAN UL," Mar. 30, 2007, 3GPP TSG-RAN WG2 Meeting #57bis, R2-071251, 2 pages.
3GPP TR 25.814 V7.0.0, Jun. 2006, "Physical layer aspects for evolved Universal Terrestrial Radio Access (UTRA)," 126 pages.

(Continued)

Primary Examiner — Faruk Hamza
Assistant Examiner — Diane Lo
(74) Attorney, Agent, or Firm — Osha Liang LLP

(57) ABSTRACT

A base station apparatus in a radio communications system is disclosed. The radio communications system has a mobile station apparatus and the base station apparatus in communication with the mobile station apparatus to which is applied a scheduling scheme which allocates a radio resource for each of constant periods. The base station apparatus includes a first transmitting unit which conducts a first transmission of a first signal for each of the constant periods based on the scheduling scheme; and a second transmitting unit which conducts second and subsequent transmissions at predetermined timings when an error occurs in the first transmission.

3 Claims, 15 Drawing Sheets

(56) References Cited

OTHER PUBLICATIONS

3GPP TSG RAN WG Meeting #47bis, R1-070103, "Downlink L1/L2 Control Signaling Channel Structure: Coding," Sorrento, Italy, Jan. 15-19, 2007, 17 pages.

TSG-RAN WG1 LTE AdHoc, R1-060099, "Persistent Scheduling for E-UTRA," Helsinki, Finland, Jan. 23-25, 2006, 2 pages.

International Search Report issued in PCT/JP2008/064366, mailed on Nov. 25, 2008, with translation, 7 pages.

Written Opinion issued in PCT/JP2008/064366, mailed on Nov. 25, 2008, 4 pages.

Office Action in corresponding Japanese Patent Application No. 2009-528122 dated Mar. 19, 2013, with translation (4 pages).

Samsung, "Text proposal on HARQ operation", 3GPP RAN WG1 LTE ad hoc meeting; R1-060133; Helsinki, Finland, Jan. 23-25, 2006 (3 pages).

Office Action issued in corresponding Chinese Application No. 200880110911.2, mailed Aug. 13, 2013 (17 pages).

Patent abstract for Chinese publication No. 101001157 from Espacenet (1 page).

Chinese Office Action for Application No. 200880110911.2, mailed on Apr. 30, 2014 (16 pages).

\* cited by examiner

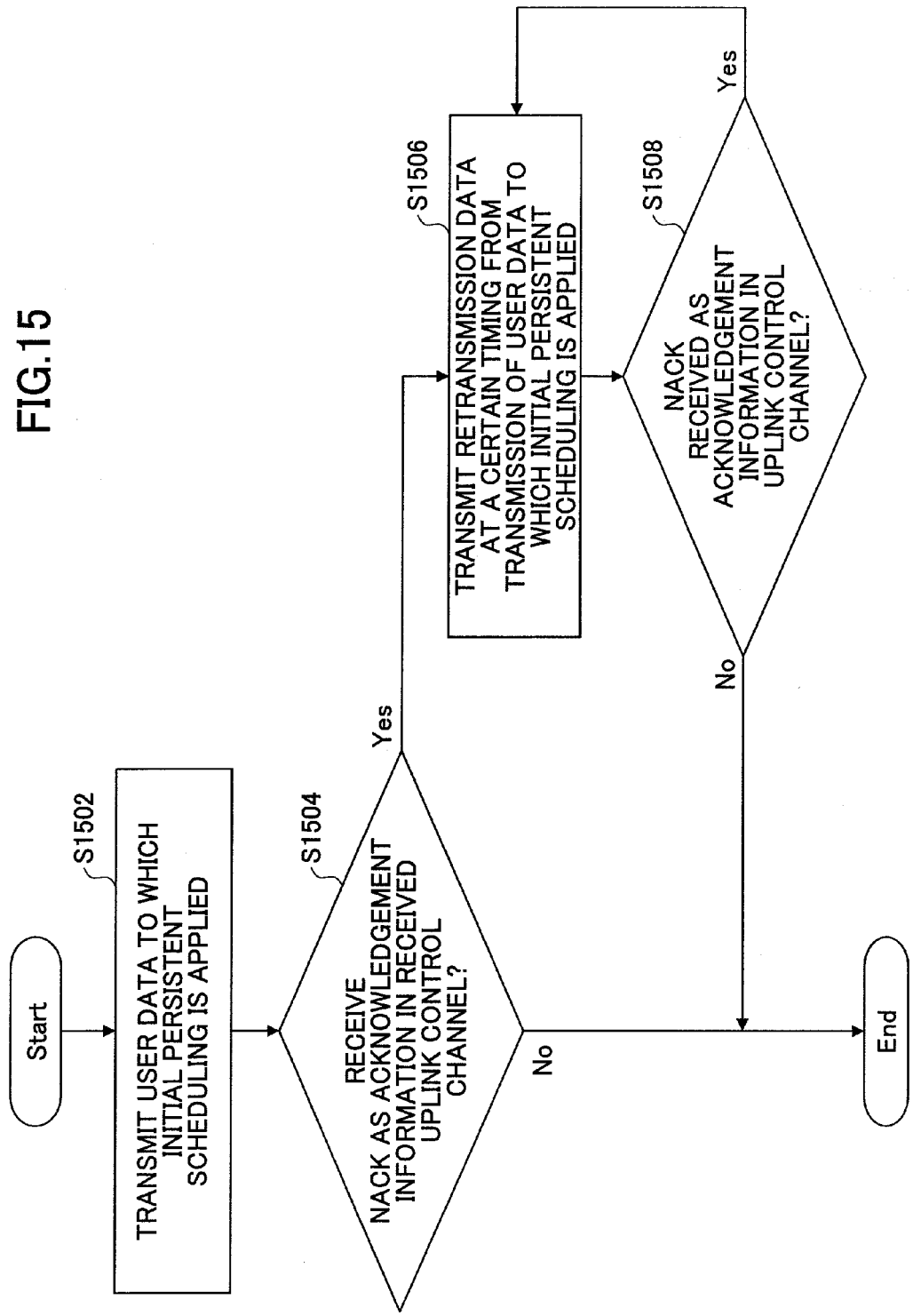

BASE STATION APPARATUS, MOBILE STATION APPARATUS, AND COMMUNICATIONS CONTROL METHOD

BACKGROUND OF THE INVENTION

1. Field of the Invention

The present invention generally relates to radio communications systems and particularly relates to base station apparatuses, mobile station apparatuses, and communications control methods.

2. Description of the Related Art

As a communications scheme to succeed W-CDMA (Wideband Code Division Multiple Access) and HSDPA, Long Term Evolution (LTE) is being studied in a W-CDMA standardization body called 3GPP. Moreover, as radio access schemes, OFDMA (Orthogonal Frequency Division Multiplexing Access) is being considered for downlink, while SC-FDMA (Single-Carrier Frequency Division Multiple Access) is being considered for uplink (see Non-patent document 1, for example).

The OFDMA, which is a scheme for dividing a frequency band into multiple narrow frequency bands (sub-carriers) and overlaying data onto the respective frequency bands to transmit the data, densely arranges the sub-carriers on the frequency axis such that one sub-carrier partially overlaps another sub-carrier without their interfering with each other, making it possible to achieve high-speed transmission and to improve frequency utilization efficiency.

The SC-FDMA is a transmission scheme which divides a frequency bandwidth and transmits using different frequency bands among multiple terminals to make it possible to reduce interference between the terminals. The SC-FDMA, which features a reduced variation in transmission power, makes it possible to achieve wide coverage as well as low power consumption of the terminals.

The LTE is a system for communicating with multiple mobile stations sharing one or more physical channels for both uplink and downlink. In the LTE, the channel shared by multiple mobile stations, which is generally called a shared channel, is a physical uplink shared channel (PUSCH) in uplink and a physical downlink shared channel (PDSCH) in downlink. Moreover, the shared channel, as a logical channel, is an uplink shared channel (UL-SCH) in uplink and a downlink shared channel (DL-SCH) in downlink.

Then, in a communications system using a shared channel as described above, it is necessary to signal for each subframe (1 ms in the LTE) which mobile station apparatus the shared channel is allocated to. In the LTE, a control channel used for the signaling is a physical downlink control channel (PDCCH) or a downlink (DL) L1/L2 control channel. Moreover, the physical downlink control channel is also used for reporting acknowledgement information for the uplink shared channel and for a transmission power control command.

Information for the physical downlink control channel includes, for example, a control channel format indicator, downlink scheduling information, acknowledgement information (ACK/NACK), an uplink scheduling grant, etc. (see Non-patent document 2, for example.) The control channel format indicator may be called a physical control format indicator channel (PCFICH).

Moreover, downlink scheduling information includes, for example, information on allocating a downlink resource block for the downlink shared channel, an ID of a UE, the number of streams, information on a pre-coding vector, a data size, a modulation scheme, information on HARQ (hybrid automatic repeat request), etc. Furthermore, the uplink scheduling grant includes, for example, information on allocating an uplink resource block for the uplink shared channel, an ID of a UE, a data size, a modulation scheme, uplink transmission power information, information on a demodulation reference signal in uplink MIMO, etc.

Furthermore, in the LTE, the HARQ is applied in a MAC layer in communications using the above-described shared channel. For example, for downlink, the mobile station apparatus decodes a downlink shared channel and transmits, to the base station apparatus, acknowledgement information based on the decoded result (CRC check result) using an uplink control channel. Then, the base station apparatus performs retransmission control according to the contents of the acknowledgement information. The contents of the acknowledgement information are expressed as ACK (acknowledgement), which indicates that a transmit signal has been received properly or NACK (negative acknowledgement), which indicates that it has not been received properly. In the meantime, for uplink, the base station apparatus decodes the uplink shared channel and transmits, to the mobile station apparatus using the downlink control channel, acknowledgement information based on the decoded result (CRC check result). Then, the mobile station apparatus performs retransmission control according to the contents of the acknowledgement information. The contents of the acknowledgement information are expressed as ACK (acknowledgement), which indicates that a transmit signal has been received properly or NACK (negative acknowledgement), which indicates that it has not been received properly. The downlink control channel may be called a physical HARQ indicator channel (PHICH).

Here, in the downlink HARQ, which is called Asynchronous HARQ, a retransmit timing with respect to an initial transmit timing is not particularly specified. In the meantime, in the uplink HARQ, which is called Synchronous HARQ, a retransmit timing with respect to the initial transmit timing is specified. More specifically, in the uplink retransmission, a periodic transmission is conducted with the initial transmit timing as a start timing. FIGS. 1 and 2 show overviews of the Asynchronous HARQ and the Synchronous HARQ.

In the LTE, for packet data with a somewhat constant transmission speed (e.g., VoIP or streaming), a scheduling scheme for allocating radio resources for each of constant periods rather than a best-effort type scheduling scheme for allocating radio resources to achieve high efficiency is being proposed (see Non-patent document 3, for example). The proposed scheduling scheme is called persistent scheduling or semi-persistent scheduling, for example.

There is shown a method of allocating downlink radio resources when persistent scheduling is applied. As shown in FIG. 3, the base station apparatus transmits a downlink shared channel for each of the constant periods (for each 20 ms as shown). In the persistent scheduling, transmitting and receiving in advance at a known transmit timing between the base station apparatus and the mobile station apparatus makes it possible to reduce downlink (DL) scheduling information for initial transmission and to effectively utilize downlink radio resources. Moreover, it suffices for the mobile station apparatus to conduct downlink reception for each of the constant periods, making it possible to reduce battery power consumption.

Furthermore, as shown in FIG. 4, when some packet data are erroneously received, the packet data are retransmitted by the base station apparatus. Here, downlink retransmission in the LTE is asynchronous. In the persistent scheduling, second and subsequent transmissions are conducted at an arbitrary timing ("retransmit timing" shown), when a HARQ round trip time (RTT) has elapsed since the initial transmit timing. Here, the retransmission is accompanied by the downlink scheduling information. In other words, the mobile station apparatus can receive the downlink scheduling information to receive packet data transmitted in the second and subsequent transmissions.

Non-patent document 1: 3GPP TR 25.814 (V7.0.0), "Physical Layer Aspects for Evolved UTRA," June 2006

Non-patent document 2: R1-070103, Downlink L1/L2 Control Signaling Channel Structure: Coding Non-patent document 3: R1-060099, Persistent Scheduling for E-UTRA, January, 2006

SUMMARY OF THE INVENTION

Problem(s) to be Solved by the Invention

However, the related art as described above has the following problems.

As shown in FIG. 5, a case is considered such that the base station apparatus does not have packet data to transmit in downlink. In this case, the base station apparatus does not transmit anything in downlink. In the meantime, the mobile station apparatus cannot distinguish between the base station apparatus not transmitting anything in downlink and the base station apparatus transmitting packet data in downlink, but the packet data are not being received correctly, so that it attempts to receive packet data to be transmitted in the second and subsequent transmissions. As a result, there arises a problem that the mobile station apparatus needs to attempt receiving packet data which may be retransmitted despite the fact that there exist no data to be received and that battery power cannot be saved.

Thus, in light of the problems as described above, the object of the present invention is to provide a base station apparatus, a mobile station apparatus, and a communications control method that are efficient and that make it possible to reduce power consumption of a mobile apparatus by restricting a retransmit timing of user data to which persistent scheduling is applied in downlink.

Means for Solving the Problem

In order to solve the problem as described above, a base station apparatus of the present invention is provided, the base station apparatus being in a radio communications system having a mobile station apparatus and the base station apparatus in communication with the mobile station apparatus to which is applied a scheduling scheme which allocates a radio resource for each of the constant periods, the base station apparatus including:

a first transmitting unit which conducts a first transmission of a first signal for each of the constant periods based on the scheduling scheme; and a second transmitting unit which conducts second and subsequent transmissions at one or more predetermined timings when an error occurs in the first transmission.

A mobile station apparatus of the present invention is provided, the mobile station apparatus being in a radio communications system having the mobile station apparatus, and a base station apparatus in communication with the mobile station apparatus, the base station apparatus applying a scheduling scheme which allocates a radio resource to the mobile station apparatus for each of the constant periods, the mobile station apparatus comprising:

a first receive unit which receives a first signal transmitted for each of the constant periods based on the scheduling scheme; and a second receive unit which receives the first signal transmitted the second and subsequent times at one or more predetermined timings when an error occurs in the first signal.

A method of controlling communications of the present invention is provided, the method being in a radio communications system having a mobile station apparatus, and a base station apparatus in communication with the mobile station apparatus, the base station apparatus applying a scheduling scheme which applies a radio resource to the mobile station apparatus for each of the constant periods, the method including:

a first transmission step of conducting, by the base station apparatus, a first transmission of a first signal for each of the constant periods based on the scheduling scheme;

a first reception step of receiving, by the mobile station apparatus, the first signal transmitted for each of the constant periods based on the scheduling scheme;

a second transmission step of conducting, by the base station apparatus, second and subsequent transmissions at predetermined timings when an error occurs in the first transmission; and a second reception step of receiving, by the mobile station apparatus, the first signal transmitted in the second and subsequent transmissions at predetermined timings when an error occurs in the first signal.

Advantage of the Invention

Embodiments of the present invention make it possible to implement a base station apparatus, a mobile station apparatus, and a communications control method that are efficient and that make it possible to reduce power consumption of a mobile apparatus in a mobile communications system in which persistent scheduling is applied in downlink.

BRIEF DESCRIPTION OF THE DRAWINGS

FIG. 15 is a flow diagram illustrating a process in a base station apparatus according to an embodiment of the present invention.

DESCRIPTION OF THE PREFERRED EMBODIMENTS

Description of Notations 50 cell; $100_n$ ($100_1$, $100_2$, $100_3$) mobile station; 102 transmit/receive antenna; 104 amplifier; 106 transmitter/receiver; 108 base band processor; 1081 L1 (Layer 1) receive processor; 1082 MAC receive processor; 1083 RLC receive processor; 1084 HARQ controller; 1081 L1 (Layer 1) transmit processor; 1082 MAC transmit processor; 1083 RLC transmit processor; 110 application unit; 200 base station apparatus; 202 transmit/receive antenna; 204 amplifier; 206 transmitter/receiver; 208 base band signal processor; 2081 L1 (Layer 1) receive processor; 2082 MAC receive processor; 2083 RLC receive processor; 2084 HARQ controller; 2081 L1 (Layer 1) transmit processor; 2082 MAC transmit processor; 2083 RLC transmit processor; 210 call processor; 212 transmission line interface; 300 access gateway apparatus; 400 core network

BEST MODE OF CARRYING OUT THE INVENTION

With reference to the drawings, a description is given below with regard to embodiments of the present invention. Throughout the drawings for explaining the embodiments, same letters are used for those elements having the same functions, so that repetitive explanations are omitted.

Figure 1:
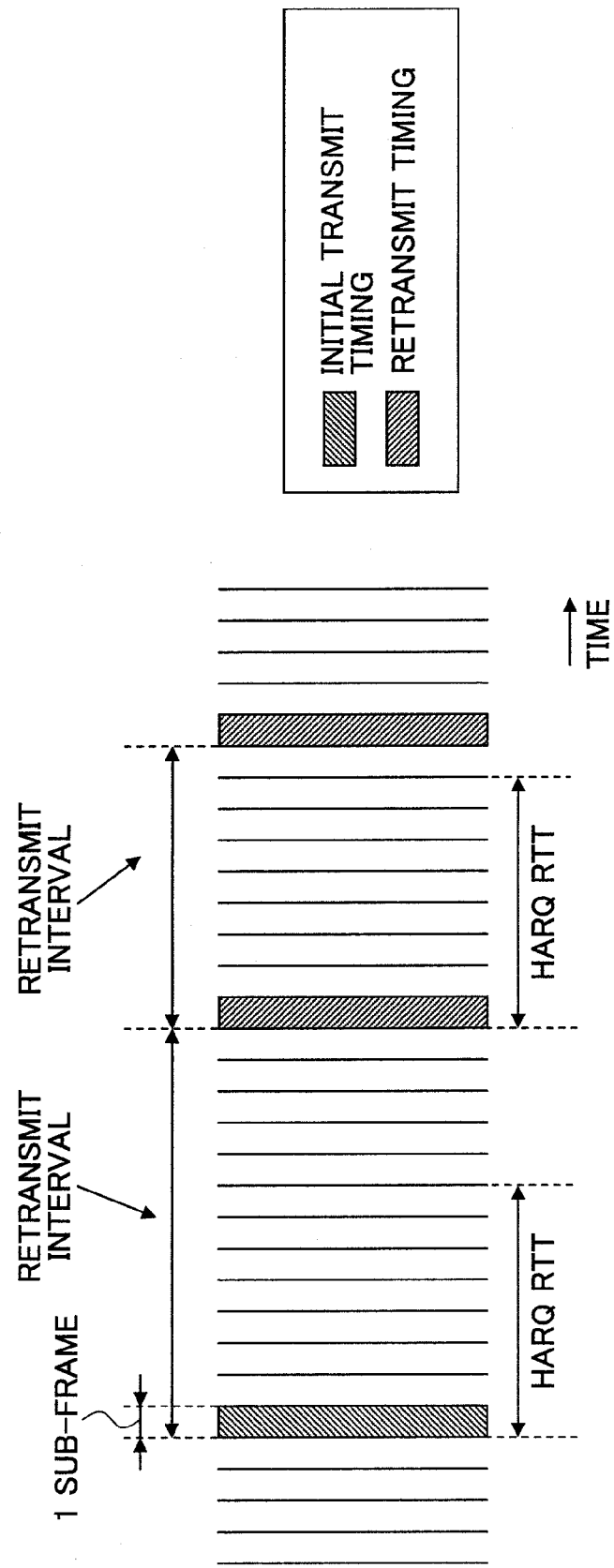
FIG. 1 is a diagram illustrating a non-synchronous HARQ.
Figure 2:
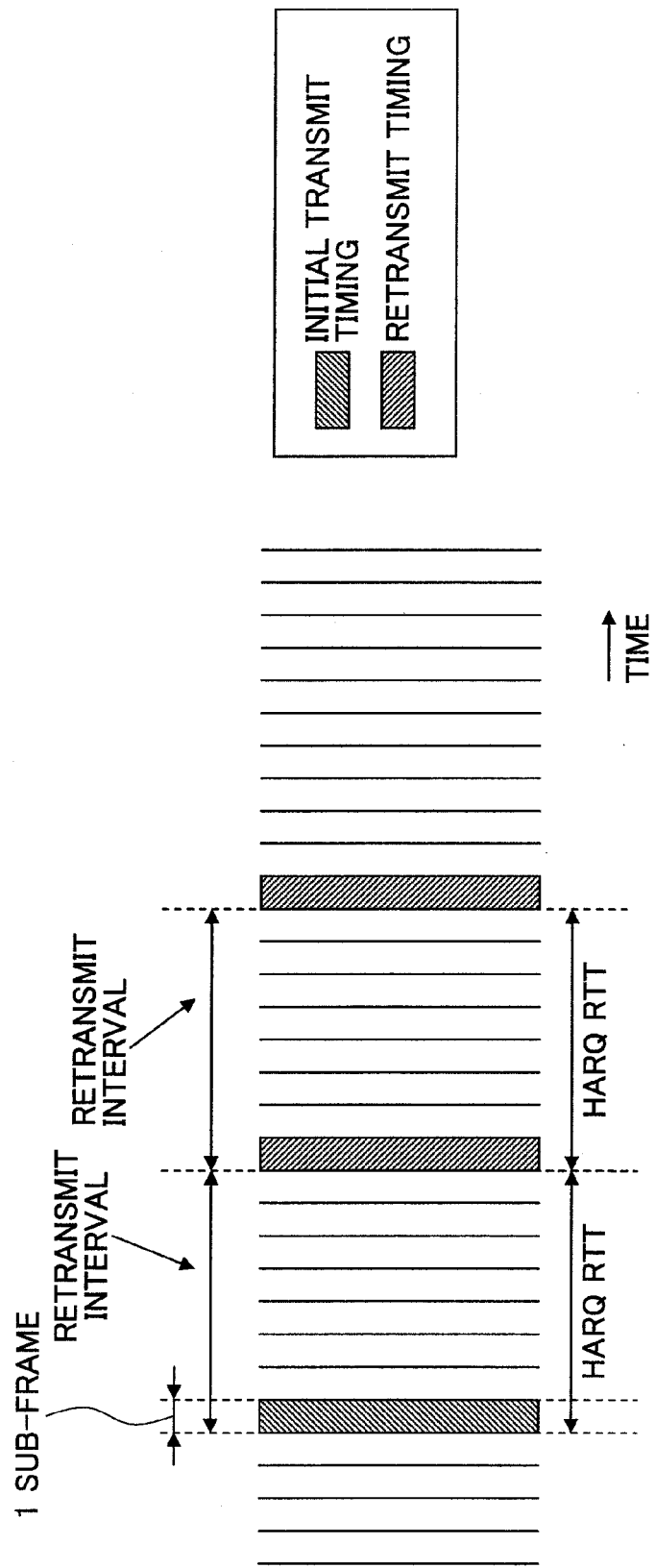
FIG. 2 is a diagram illustrating a synchronous HARQ.
Figure 3:
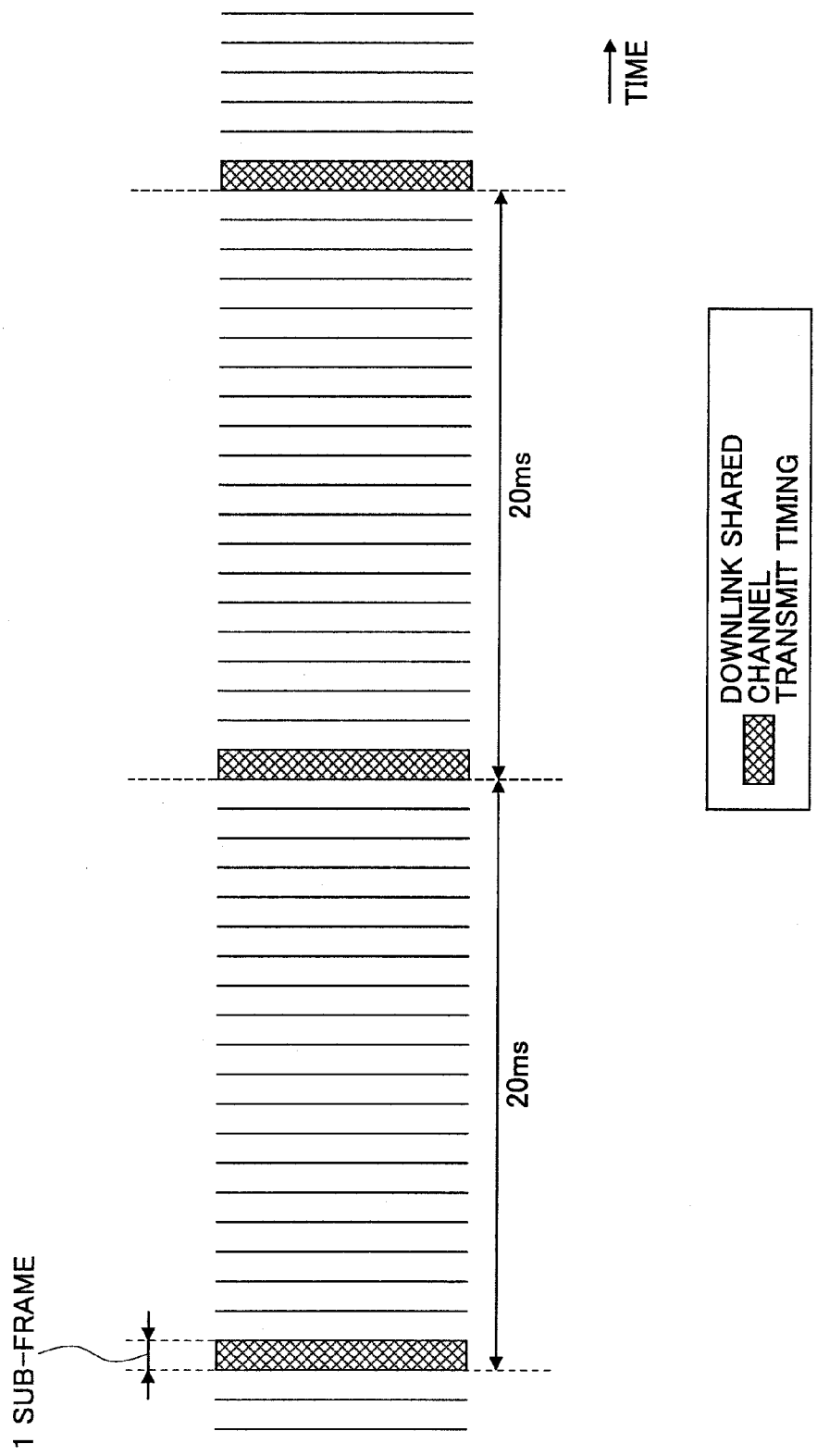
FIG. 3 is an explanatory diagram illustrating allocation of downlink radio resources when persistent scheduling is applied.
Figure 4:
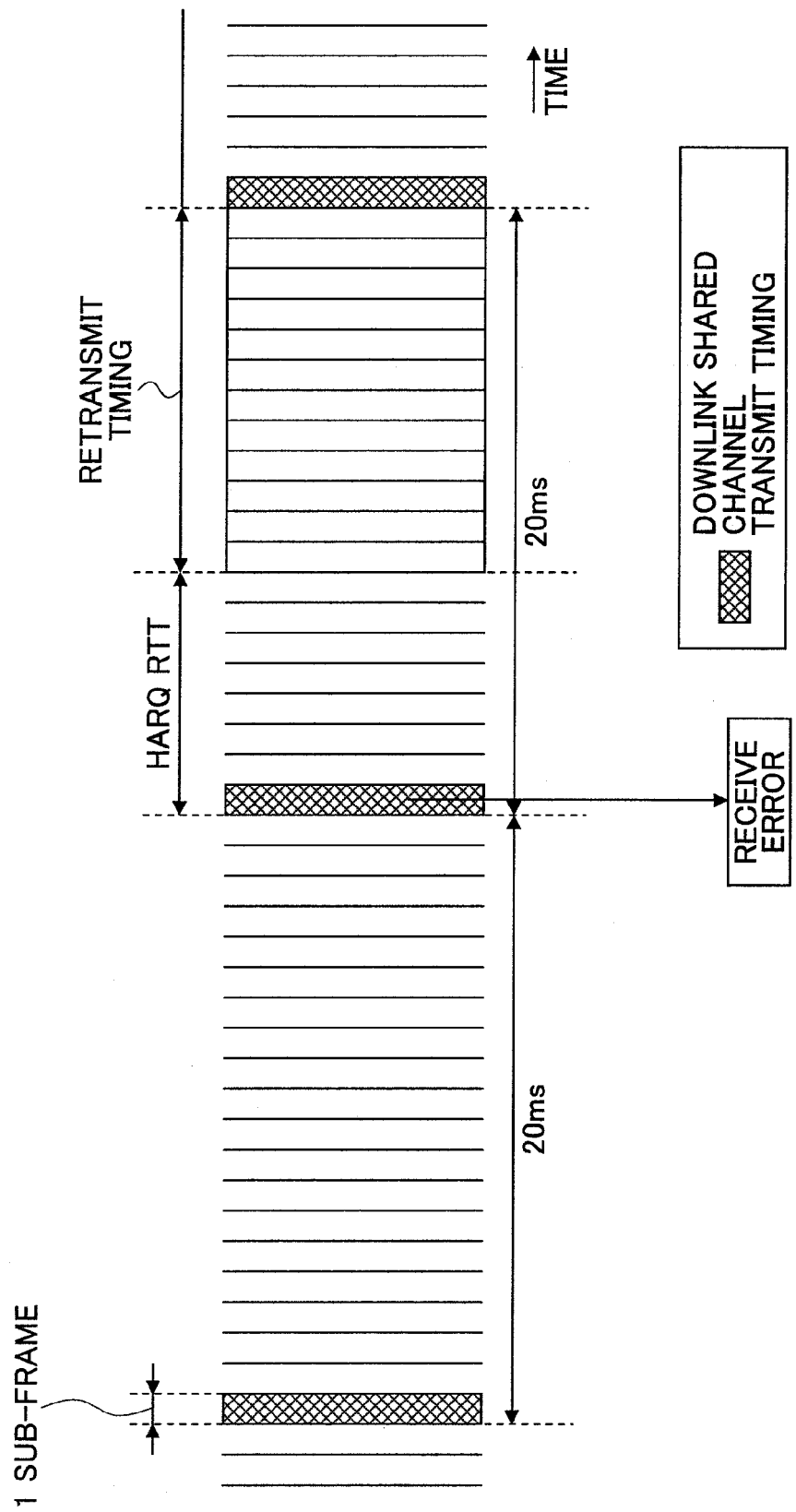
FIG. 4 is an explanatory diagram illustrating retransmit timing when persistent scheduling is applied.
Figure 5:
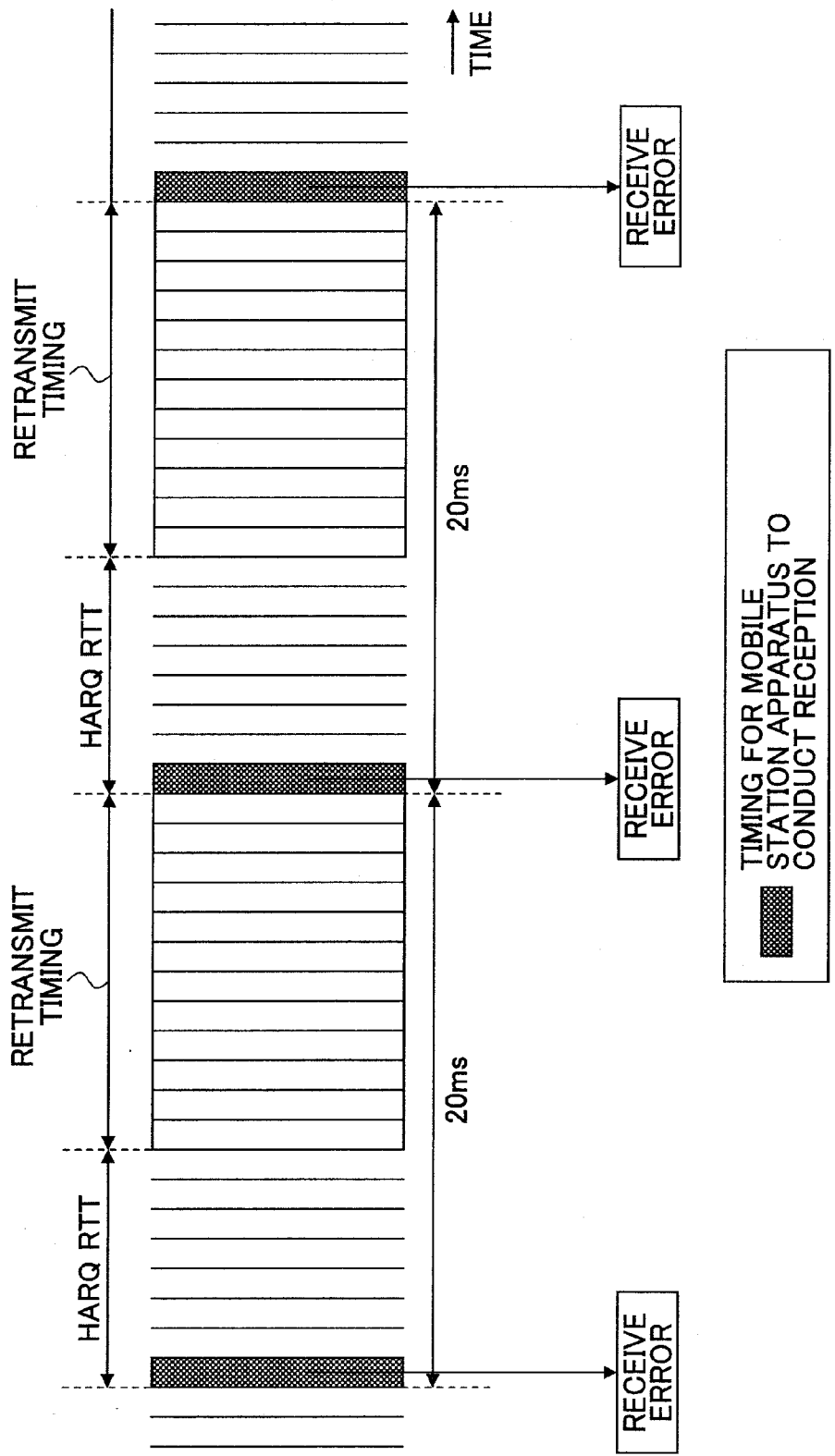
FIG. 5 is an explanatory diagram illustrating retransmit timings when persistent scheduling is applied.
Figure 6:
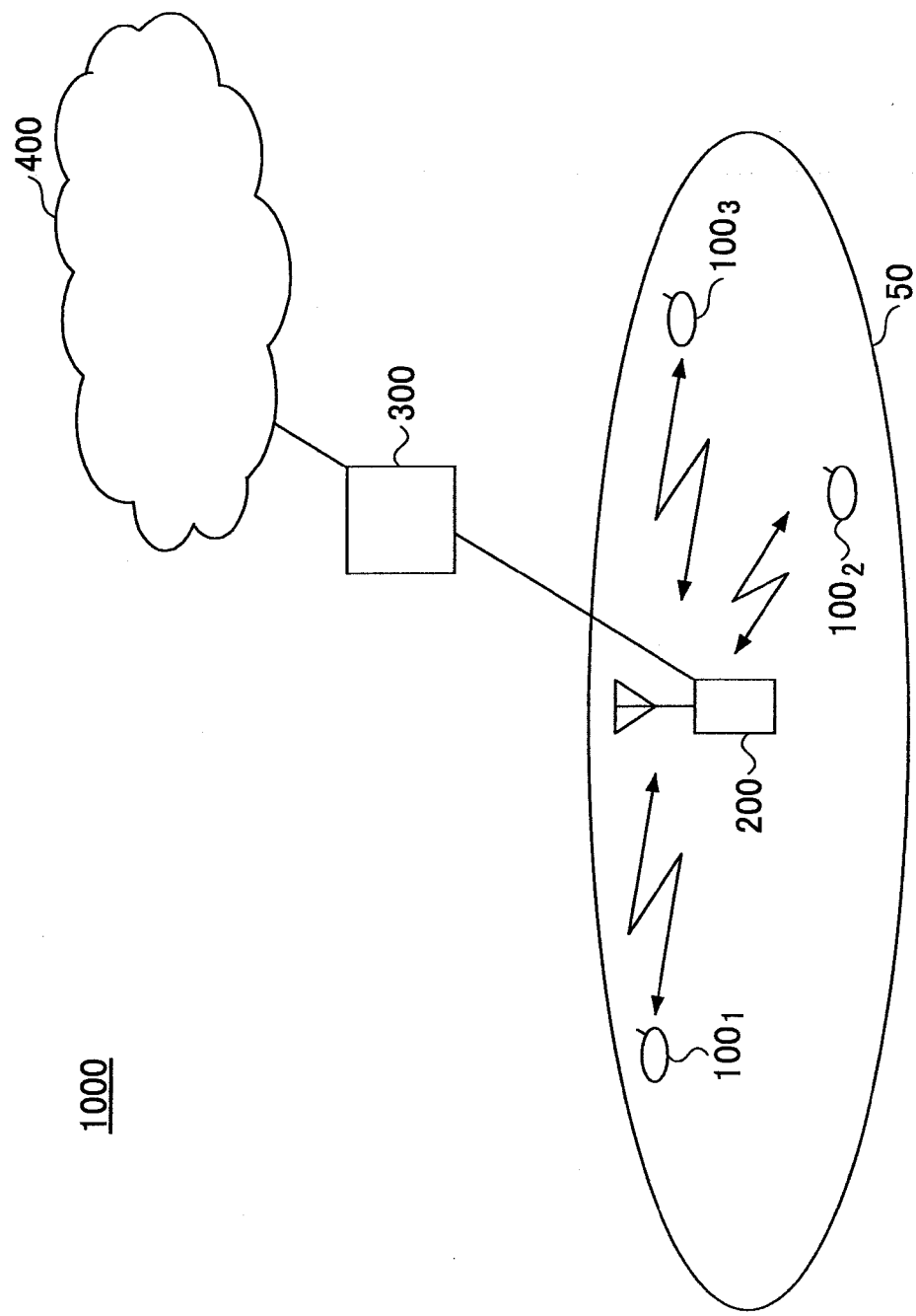
FIG. 6 is a block diagram illustrating a configuration of a radio communications system according to an embodiment of the present invention.

A radio communications system having a base station apparatus and mobile station apparatuses according to an embodiment of the present invention is described with reference to FIG. 6.

The radio communications system 1000 is a system to which Evolved UTRA and UTRAN (also called Long Term Evolution or Super 3G) is applied, for example. The radio communications system 1000 includes a base station apparatus (eNB: eNode B) 200, and multiple mobile station apparatuses $100_n$ ($100_1$, $100_2$, $100_3$, ..., $100_n$, where n is an integer greater than 0) in communication with the base station apparatus 200. The base station apparatus 200 is connected to an upper-layer station, for example, an access gateway apparatus 300, which is connected to a core network 400. The mobile station $100_n$ communicates with the base station apparatus 200 via Evolved UTRA and UTRAN in a cell 50. The access gateway apparatus 300 may be called an MME/SGW (mobility management entity/serving gateway).

Below, respective mobile station apparatuses ($100_1$, $100_2$, $100_3$, ..., $100_n$) have the same configuration, function, and status. Thus, unless otherwise indicated, they will be explained below as the mobile station apparatuses $100_n$. For convenience of explanations, what wirelessly communicates with the base station apparatus is a mobile station apparatus, but more generally may be a user equipment (UE) unit which includes a mobile terminal or a fixed terminal.

In the radio communications system 1000, OFDMA (Orthogonal Frequency Division Multiple Access) is applied for downlink and SC-FDMA (Single Carrier-Frequency Division Multiple Access) is applied for uplink as radio access schemes. As described above, the OFDMA is a scheme for dividing a frequency band into multiple narrow frequency bands (sub-carriers) and mapping data onto the respective sub-carriers to communicate the mapped data. SC-FDMA is a single-carrier transmission scheme which divides a frequency bandwidth among terminals and uses mutually different frequency bands among the multiple terminals to reduce inter-terminal interference.

Here, communication channels in Evolved UTRA and UTRAN are described.

For downlink, a PDSCH (physical downlink shared channel), which is shared by the mobile stations $100_n$, and a PDCCH (physical downlink control channel) are used. The physical downlink control channel may also be called a downlink L1/L2 channel. User data are transmitted using the physical downlink shared channel. Moreover, a downlink (DL) L1/L2 control channel format indicator, downlink scheduling information, acknowledgement information (ACK/NACK), an uplink scheduling grant, an overload indicator, a transmission power control command bit, etc., are transmitted using the physical downlink control channel. The downlink L1/L2 control channel format indicator may be called a PCFICH (physical control format indicator channel). Moreover, the downlink scheduling information may be called downlink assignment information or a downlink scheduling grant. Furthermore, the downlink scheduling information and the uplink scheduling grant may collectively be called downlink control information.

The downlink scheduling information includes, for example, an ID of a user which communicates using the physical downlink shared channel, information on a transport format of the user data, i.e., a data size, a modulation scheme, information on HARQ, information on allocating downlink resource blocks, etc.

Moreover, the uplink scheduling grant includes, for example, an ID of a user which communicates using the physical uplink shared channel, information on a transport format of the user data, i.e., a data size, information on a modulation scheme, information on allocating uplink resource blocks, information on transmit power of the uplink shared channel, etc. Here, the uplink resource block, which corresponds to a frequency resource, may be called a resource unit.

Furthermore, the acknowledgement information (ACK/NACK) refers to acknowledgement information on the uplink shared channel. The acknowledgement information (ACK/NACK) may be mapped by a physical HARQ indicator channel (PHICH), not the physical downlink control channel.

In uplink, a PUSCH (physical uplink shared channel), which is shared for use by each of the mobile stations $100_n$, and a physical uplink control channel are used. User data are transmitted using the physical uplink shared channel. Moreover, quality information (CQI: channel quality indicator) for use in adaptive modulation and coding (AMC) and a scheduling process for the downlink shared physical channel as well as acknowledgement information for the physical downlink shared channel are transmitted using the physical uplink control channel. The contents of the acknowledgement information may be expressed as one of an acknowledgement (ACK) which indicates that a transmit signal has been received properly and a negative acknowledgement (NACK) which indicates that it has not been received properly.

In the physical uplink control channel, in addition to the CQI and acknowledgement information, a scheduling request for requesting resource allocation of the uplink shared channel, a release request in persistent scheduling, etc., may be transmitted. Here, the resource allocation of the uplink shared channel means the base station apparatus 206 reports to the mobile stations 100$_n$ that communications may be conducted using the uplink shared channel in a subsequent sub-frame using the uplink scheduling grant within the physical downlink control channel of a certain sub-frame.

The above-described user data includes, for example, IP packets for using Web browsing, FTP, VoIP, etc., and a control signal for the radio resource control (RRC) process. Moreover, user data may be called, as a transport channel, DL-SCH or UL-SCH, for example, and as a logical channel, a dedicated traffic channel (DTCH) or a dedicated control channel (DCCH), for example.

Figure 7:
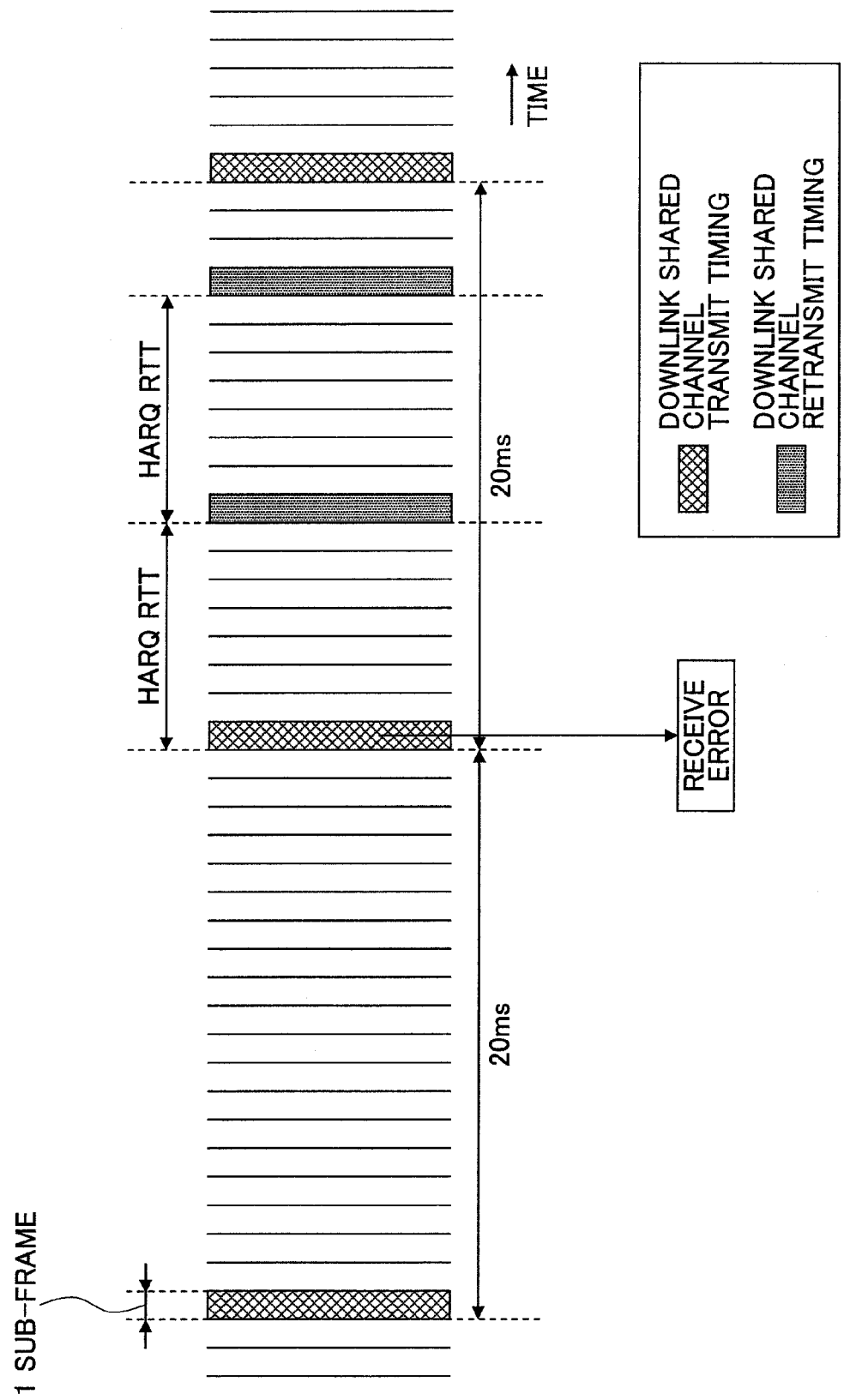
FIG. 7 is one explanatory diagram illustrating a method of retransmitting HARQ for packet data to which persistent scheduling is applied according to one embodiment of the present invention.
Figure 8:
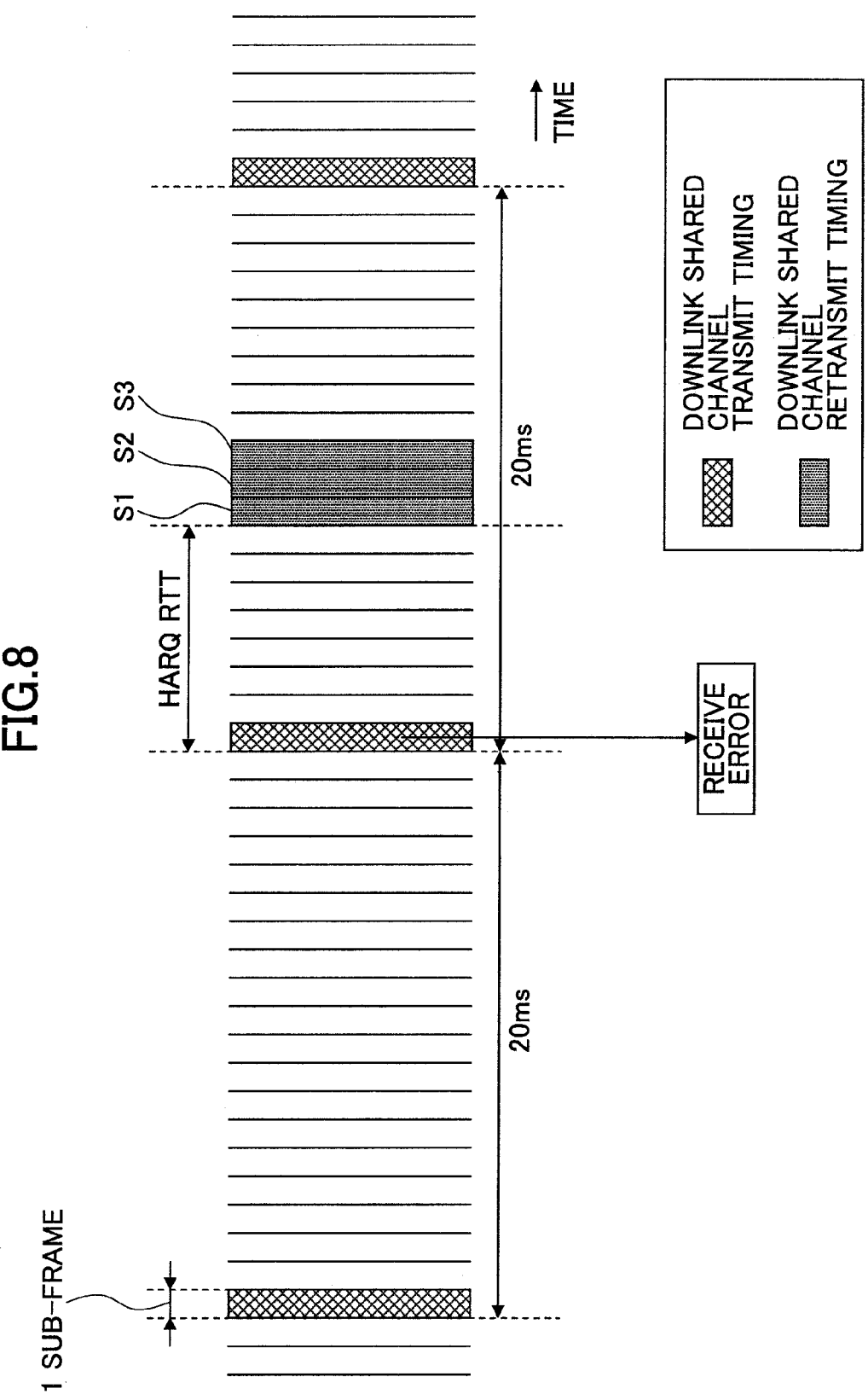
FIG. 8 is another explanatory diagram illustrating the method of retransmitting HARQ for packet data, in which persistent scheduling is applied according to one embodiment of the present invention.

Using FIGS. 7 and 8, a description is provided in detail with respect to a method of retransmitting HARQ for packet data to which persistent scheduling (i.e., a method of scheduling in which radio resources are allocated for each of the constant periods) is applied. The persistent scheduling may be called semi-persistent scheduling.

In the present embodiment, as shown in FIGS. 7 and 8, when the decoded result (CRC check result) of user data to which initial transmission persistent scheduling is applied is NG in downlink, the base station apparatus 200 retransmits, at a predetermined timing, user data to which the persistent scheduling is applied. Here, downlink scheduling information for packet data to which retransmission persistent scheduling is applied is transmitted, accompanying the user data as described above, to the mobile station apparatus 100$_n$ using downlink scheduling information in the above-described physical downlink control channel.

Here, the predetermined timing means transmitting packet data (a downlink shared channel to which persistent scheduling is applied) at a synchronous HARQ retransmit timing as shown in FIG. 7, for example. The synchronous HARQ retransmit timing is a retransmit timing specified for the initial transmit timing. In this case, for the downlink retransmission, a periodic transmission is conducted with the initial transmit timing as a start timing.

Alternatively, the predetermined timing means transmitting packet data (a downlink shared channel to which persistent scheduling is applied) at a certain range of transmission timings as shown in FIG. 8, for example. In FIG. 8, a sequence of sub-frames S1, S2, and S3 in minimum retransmit time intervals corresponds to the retransmit timing. As shown, the certain range is 3 sub-frames. However, it can take a value other than 3 (e.g., 1 or 2, or 4, 5, . . . ). Moreover, as shown, while only the first retransmission is described, even for the second and subsequent retransmissions, packet data (a downlink shared channel to which persistent scheduling is applied) may be transmitted at a certain range of transmission timings.

The above-described sequence of sub-frames S1, S2, and S3 in the minimum retransmit time intervals may be called a retransmit timer. In other words, an interval in which the retransmit timer elapses from the sub-frame in a minimum retransmit time interval corresponds to the retransmit timing. For the example in FIG. 8, the retransmit timer is set at 3 ms. The retransmit timer may be called a DRX retransmit timer.

Here, the minimum retransmit time interval may be called a HARQ RTT (RTT: Round Trip Time). Alternatively, the minimum retransmit time interval may be called an HARQ RTT Timer. In other words, the HARQ RTT Timer is initiated from the timing at which a certain HARQ is transmitted, and expires when the HARQ RTT elapses. For example, the HARQ RTT in the LTE is 8 ms. In this case, the minimum retransmit time interval is 8 ms. In this case, the DRX retransmit timer is initiated when the HARQ RTT timer has expired (a timing which is immediately before S1 in FIG. 8) and the packet data are not correctly decoded, and the packet data are retransmitted when the DRX retransmit timer has been initiated (S1, S2 and S3 in FIG. 8).

Here, "the packet data are not correctly decoded" means that the packet data are those packet data to be retransmitted. Moreover, "the packet data are not correctly decoded" may mean that "the packet data within the soft buffer of the HARQ process are not correctly decoded" from a point of view of the mobile station. Alternatively, "the packet data are not correctly decoded" may mean that "ACK is not received as acknowledgement information for the packet data of the HARQ process" from the point of view of the base station apparatus.

Moreover, "the packet data are retransmitted when the DRX retransmit timer has been initiated" may mean, for example, that, from the mobile station point of view, reception is attempted of the PDCCH for retransmitting the packet data, i.e., that the PDCCH is monitored. The above-described recitation "the packet data are retransmitted when the DRX retransmit timer has been initiated" may mean, for example, that, when viewed from the base station apparatus point of view, transmission is conducted of the PDCCH for retransmitting the packet data.

Figure 9:
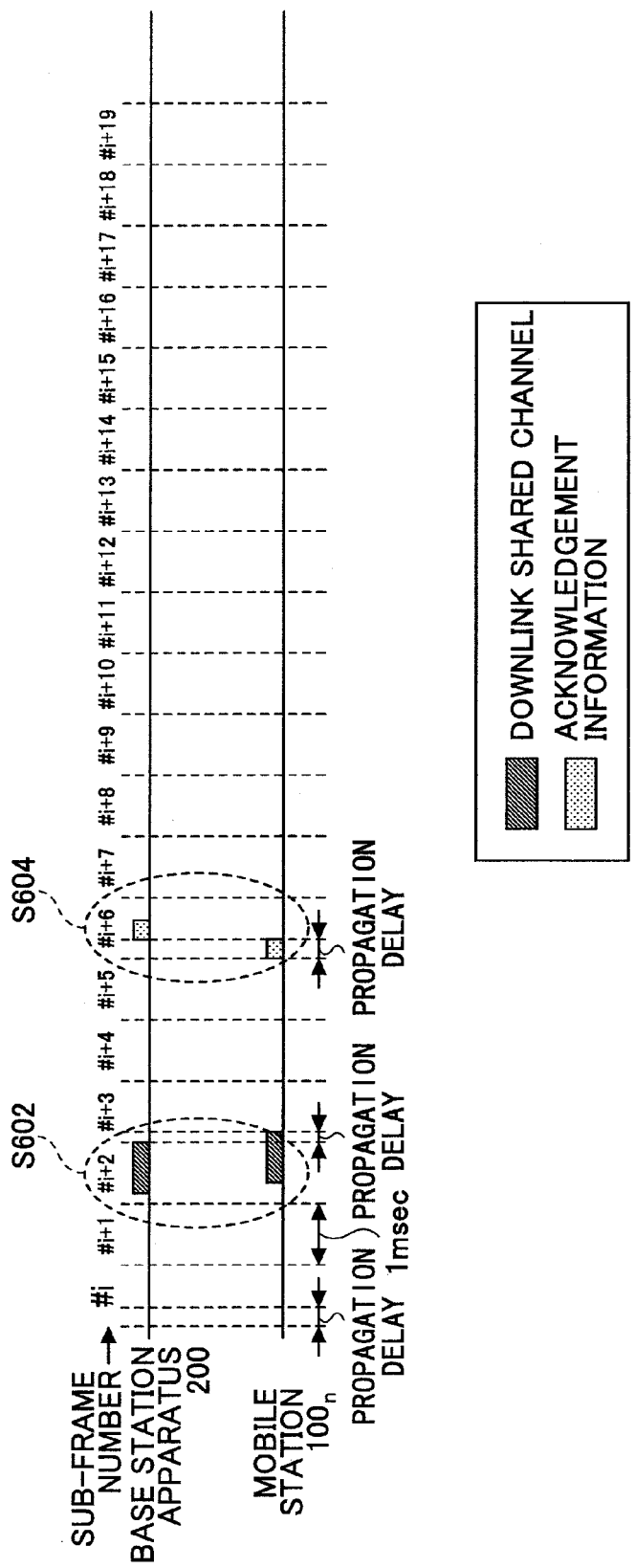
FIG. 9 is an explanatory diagram illustrating processes of a mobile station apparatus and a base station apparatus in a HARQ process for packet data to which persistent scheduling is applied according to one embodiment of the present invention.

In the meantime, as shown in FIG. 9, the base station apparatus 200 transmits, at a certain timing (a sub-frame #i+2), user data to which persistent scheduling is applied (step S602). The mobile station apparatus 100$_n$ decodes, in downlink, user data to which the persistent scheduling is applied, and when the decoded result (the CRC check result) is OK, an acknowledgement (ACK) which indicates that the transmit signal has been received properly is transmitted to the base station apparatus 200 (step S604). As a result, the base station apparatus 200 does not reply with the downlink scheduling information to the mobile station apparatus 100$_n$.

Below, a procedure is described in further detail of HARQ of user data to which persistent scheduling is applied.

Figure 10:
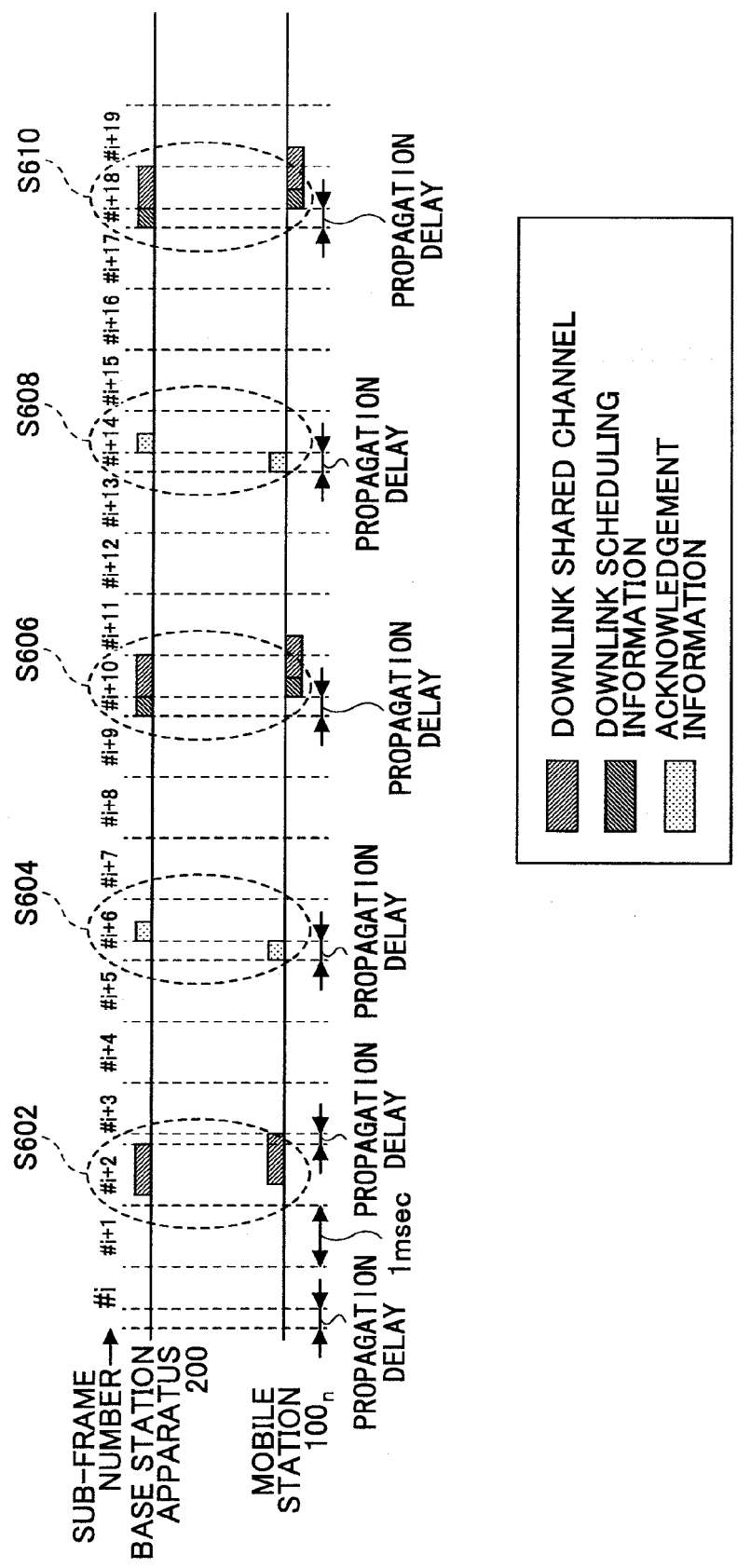
FIG. 10 is an explanatory diagram illustrating processes of a mobile station apparatus and a base station apparatus in a HARQ process for packet data, in which persistent scheduling is applied according to one embodiment of the present invention.

First, a description is given with reference to FIG. 10 for a case in which the result of decoding the user data to which initial transmission persistent scheduling is applied is NG.

The base station apparatus 200 transmits, at a predetermined timing (a sub-frame #i+2), user data to which persistent scheduling is applied (step S602). The mobile station 100$_n$ receives the user data to which the persistent scheduling is applied, and decodes the user data to which the persistent scheduling is applied.

The mobile station 100$_n$ transmits acknowledgement information using an uplink control channel in accordance with the decoded result (CRC check result) of the user data to which persistent scheduling is applied. More specifically, when the decoded result of the user data is NG, the mobile station 100$_n$ transmits, to the base station apparatus 200 as acknowledgement information, negative acknowledgement (NACK) which indicates that the transmit signal has not been received properly; and when the decoded result of the user data is OK, the mobile station $100_n$ transmits, to the base station apparatus 200 as acknowledgement information, an acknowledgement (ACK) which indicates that the transmit signal has been received properly (step S604).

Here, when the decoded result of the user data is NG and a negative acknowledgement (NACK) which indicates that the transmit signal has not been received properly is received from the mobile station $100_n$ as acknowledgement information, the base station apparatus 200 transmits, to the mobile station apparatus $100_n$, user data to which retransmission persistent scheduling is applied as well as downlink scheduling information for retransmitting user data to which persistent scheduling is applied (step S606). For example, the base station apparatus 200 transmits, to the mobile station apparatus $100_n$ at a synchronous HARQ retransmit timing, user data to which retransmission persistent scheduling is applied, and downlink scheduling information using the physical downlink control channel for retransmitting the user data to which persistent scheduling is applied. The downlink scheduling information is transmitted accompanying the retransmission data.

The mobile station apparatus $100_n$ receives user data to which retransmission persistent scheduling is applied as well as downlink scheduling information for retransmitting user data to which persistent scheduling is applied (step S606). As a result, the mobile station apparatus $100_n$ can receive the retransmitted packet data.

The mobile station $100_n$ decodes the retransmitted packet data, and transmits acknowledgement information using an uplink control channel in accordance with the decoded result (CRC check result) of user data. More specifically, when the decoded result of the retransmitted packet data is NG, the mobile station $100_n$ transmits, to the base station apparatus 200 as acknowledgement information, a negative acknowledgement (NACK) which indicates that the transmit signal has not been received properly, and when the decoded result of the retransmitted packet data is OK, the mobile station $100_n$ transmits, to the base station apparatus 200 as acknowledgement information, an acknowledgement (ACK) which indicates that the transmit signal has been received properly (step S608).

When the decoded result of the retransmitted packet data is NG and a negative acknowledgement (NACK) which indicates that the transmit signal has not been received properly is received as acknowledgement information from the mobile station $100_n$, the base station apparatus 200 transmits, to the mobile station apparatus $100_n$, user data to which retransmission persistent scheduling is applied as well as downlink scheduling information for retransmitting user data to which persistent scheduling is applied (step S610). In this way, even for the second and subsequent retransmissions, user data to which retransmission persistent scheduling is applied and downlink scheduling information for retransmitting user data to which persistent scheduling is applied are transmitted to the mobile station apparatus $100_n$ at a retransmit timing (a sub-frame #i+18) of the synchronous HARQ. Moreover, retransmit timing of the synchronous HARQ does not have to be a transmit timing after a minimum retransmit time, so that downlink scheduling information for retransmitting user data to which persistent scheduling is applied and user data to which retransmission persistent scheduling is applied may be transmitted to the mobile station $100_n$ at an arbitrary timing which is not earlier than a minimum retransmit time (HARQ round trip time (RTT)) afterwards, as long as the arbitrary timing is a periodic transmit timing.

Figure 11:
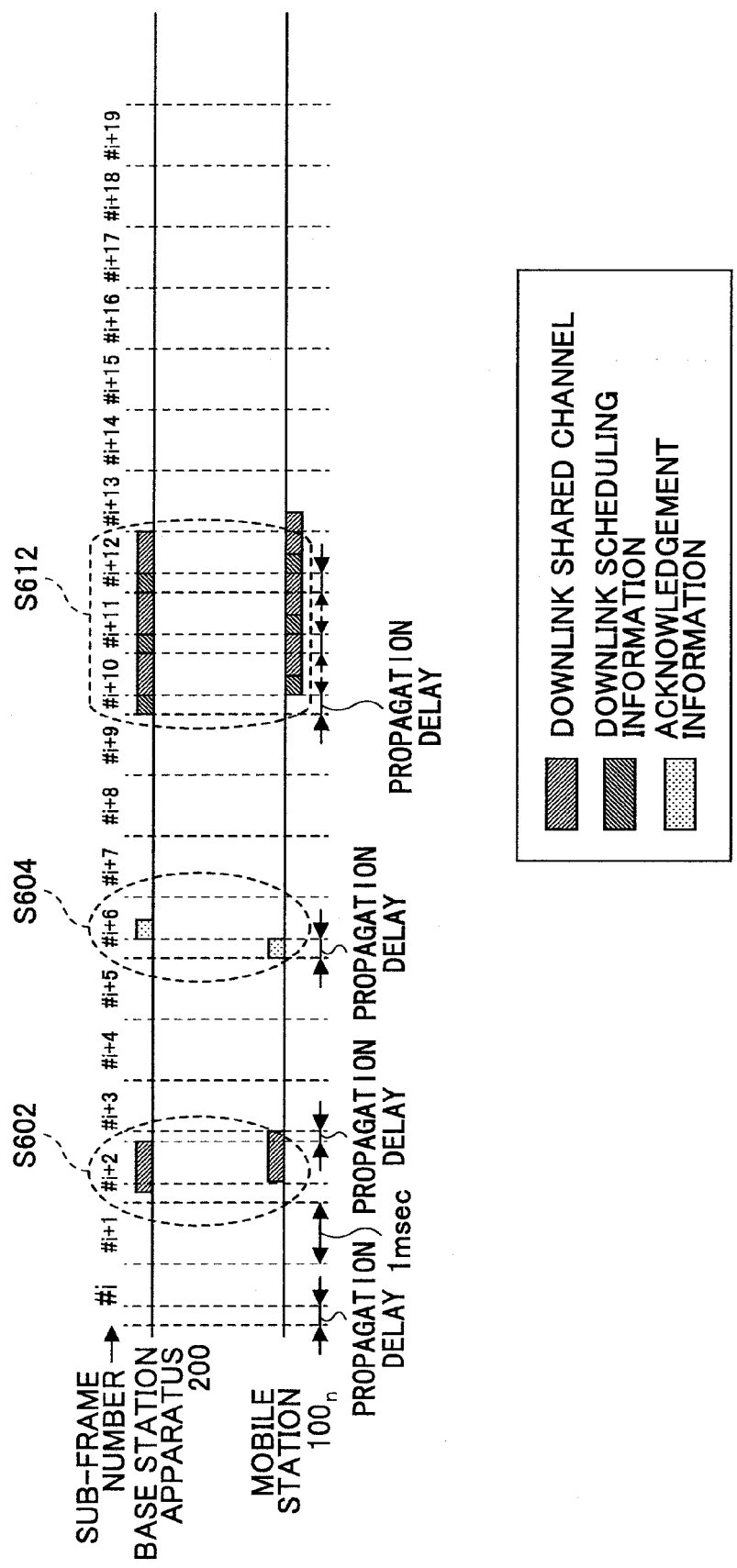
FIG. 11 is an explanatory diagram illustrating processes of a mobile station apparatus and a base station apparatus in a HARQ process for packet data, in which persistent scheduling is applied according to one embodiment of the present invention.

Alternatively, as shown in FIG. 11, the base station apparatus 200 may transmit packet data (a downlink shared channel to which persistent scheduling is applied) at a certain range of transmit timings (step S612). In FIG. 11, a sequence of sub-frames #i+10, #i+11, and #i+12 at minimum retransmit time intervals corresponds to the retransmit timing. As shown, the certain range is 3 sub-frames. However, it can take a value other than 3 (e.g., 1 or 2, or 4, 5, . . . ). Moreover, as shown, while only the first retransmission is described, even for the second and subsequent retransmissions, packet data (downlink shared channel to which persistent scheduling is applied) may similarly be transmitted at a certain range of transmit timings. Here, the base station apparatus 200 transmits retransmission packet data at any one of the sub-frames, which are in the certain range of transmission timings.

In this way, limiting the retransmit timing of user data to which persistent scheduling is applied in downlink makes it possible for a mobile station apparatus to save battery power as it suffices to conduct reception at the above-mentioned timing.

Figure 12:
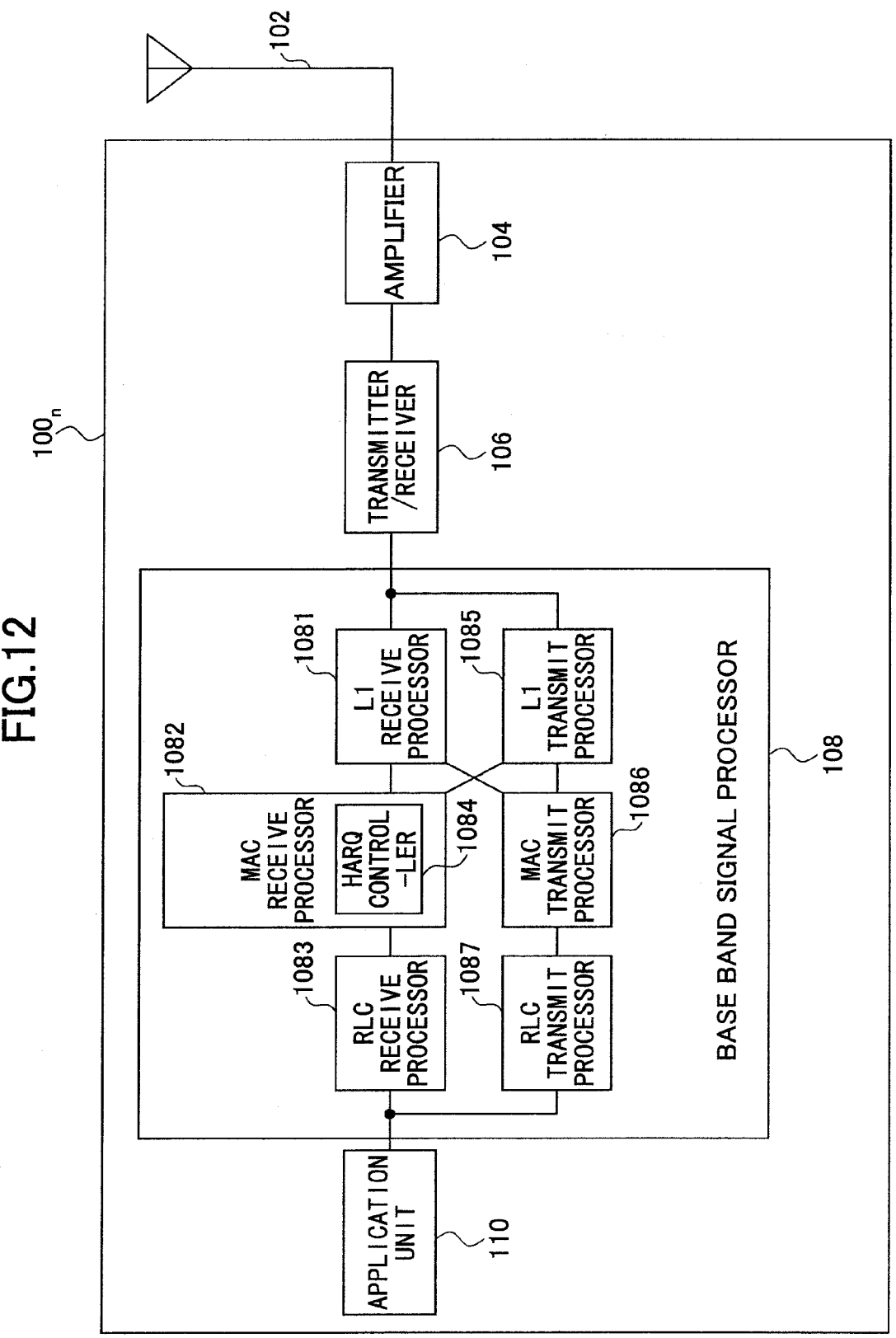
FIG. 12 is a partial block diagram illustrating a mobile station apparatus according to an embodiment of the present invention.

The mobile station $100_n$ according to the embodiment of the present invention is described with reference to FIG. 12.

As shown, the mobile station $100_n$ includes a transmit/receive antenna 102, an amplifier 104, a transmitter/receiver 106, a base band signal processor 108, and an application unit 110. Moreover, the base band signal processor 108 includes an L1 receive processor 1081 and; a MAC receive processor 1082 as first and second receive units; an RLC receive processor 1083; an L1 transmit processor 1085; a MAC transmit processor 1086; and an RLC transmit processor 1087. Furthermore, the MAC receive processor 1082 includes a HARQ controller 1084.

With respect to the downlink data, a radio frequency signal received at the transmit/receive antenna 102 is amplified at the amplifier 104, and frequency converted at the transmitter/receiver 106 to a base band signal. The base band signal as described above undergoes an FFT process, error correcting decoding, a retransmission control reception process, etc., at the base band signal processor 108. Of the downlink data, downlink user data are transferred to the application unit 110. The application unit 110 performs the process with respect to a layer upper to a physical layer, a MAC layer, or an RLC layer.

On the other hand, the uplink user data are input into the base band signal processor 108 from the application unit 110. In the base band signal processor 108, they undergo the PDCP layer transmission process, the RLC layer transmission process, a retransmission control H-ARQ (Hybrid ARQ) transmission process, channel encoding, a DFT process, an IFFT process, etc., to be transferred to the transmitter/receiver 106, which performs a frequency conversion process in which a base band signal output from the base band signal processor 108 is converted to a radio frequency band. Then, the signal is amplified at the amplifier 104, which amplified signal is transmitted from the transmit/receive antenna 102.

The process in the mobile station apparatus that is for HARQ of user data to which persistent scheduling is applied, that has been described with reference to FIGS. 7 to 11 according to the present invention, is performed in the base band signal processor 108 in FIG. 12.

Below an explanation is given for the L1 receive processor 1081, the MAC receive processor 1082, the RLC receive processor 1083, the HARQ controller 1084, the L1 transmit processor 1085, the MAC transmit processor 1086, and the RLC transmit processor 1087 that are within the base band signal processor 108.

The present invention is an invention related to persistent scheduling in downlink. Thus, only portions related to persistent scheduling in downlink are described, and the other portions are omitted.

In the L1 (Layer 1) receive processor 1081, FFT processing and channel decoding are performed on user data to which persistent scheduling is applied, at a receive timing (a sub-frame #i+2 in FIGS. 10 and 11) to which initial transmission persistent scheduling is applied. Then, the L1 (Layer 1) receive processor 1081 transmits the decoded result to the MAC receive processor 1082. Moreover, when the decoded result is NG and the user data to which persistent scheduling is applied are retransmitted, the L1 receive processor 1081 performs the FFT processing and channel decoding on the retransmission data at predetermined timings (sub-frame #i+10 in FIG. 10 and sub-frames #i+10, #i+11, and #i+12 in FIG. 11) from user data retransmissions to which initial persistent scheduling is applied. In this case, decoding is also performed on downlink scheduling information which accompanies the user data retransmitted. In other words, based on information reported using downlink scheduling information, the user data retransmitted is decoded. Then, the L1 receive processor 1081 transmits the decoded result to the MAC receive processor 1082.

The MAC receive processor 1082 receives decoded results of retransmission user data, downlink scheduling information for retransmission user data, and user data to which initial transmission persistent scheduling is applied. Then, the MAC processor 1082 inputs the decoded results to the HARQ controller 1084. The HARQ controller 1084 generates, based on the input decoded results of the user data to which persistent scheduling is applied, acknowledgement information to be transmitted using the uplink control channel. More specifically, when the decoded results of the user data to which persistent scheduling is applied are OK, an ACK is generated, and, when the decoded results of the user data to which persistent scheduling is applied are NG, a NACK is generated. The acknowledgement information transmitted using the uplink control channel is transmitted to the base station apparatus 200 via the L1 transmit processor 1085, the transmitter/receiver 106, the amplifier 104, and the antenna 102.

At a retransmission receive timing of user data to which predetermined persistent scheduling is applied, the L1 receive processor 1081 and the MAC receive processor 1082 perform a receive process for receiving, from the base station apparatus 200, retransmission user data to which persistent scheduling is applied. For example, as described with reference to FIGS. 7 through 11, packet data (a downlink shared channel to which persistent scheduling is applied) is received at a synchronous HARQ retransmit timing. Alternatively, it may be arranged for packet data (a downlink shared channel to which persistent scheduling is applied) to be received within a certain range of transmit timings after a minimum retransmit time interval.

In this way, the mobile station apparatus can perform the receive process at a restricted timing, reducing an extra receive process. As a result, battery power may be saved.

Figure 13:
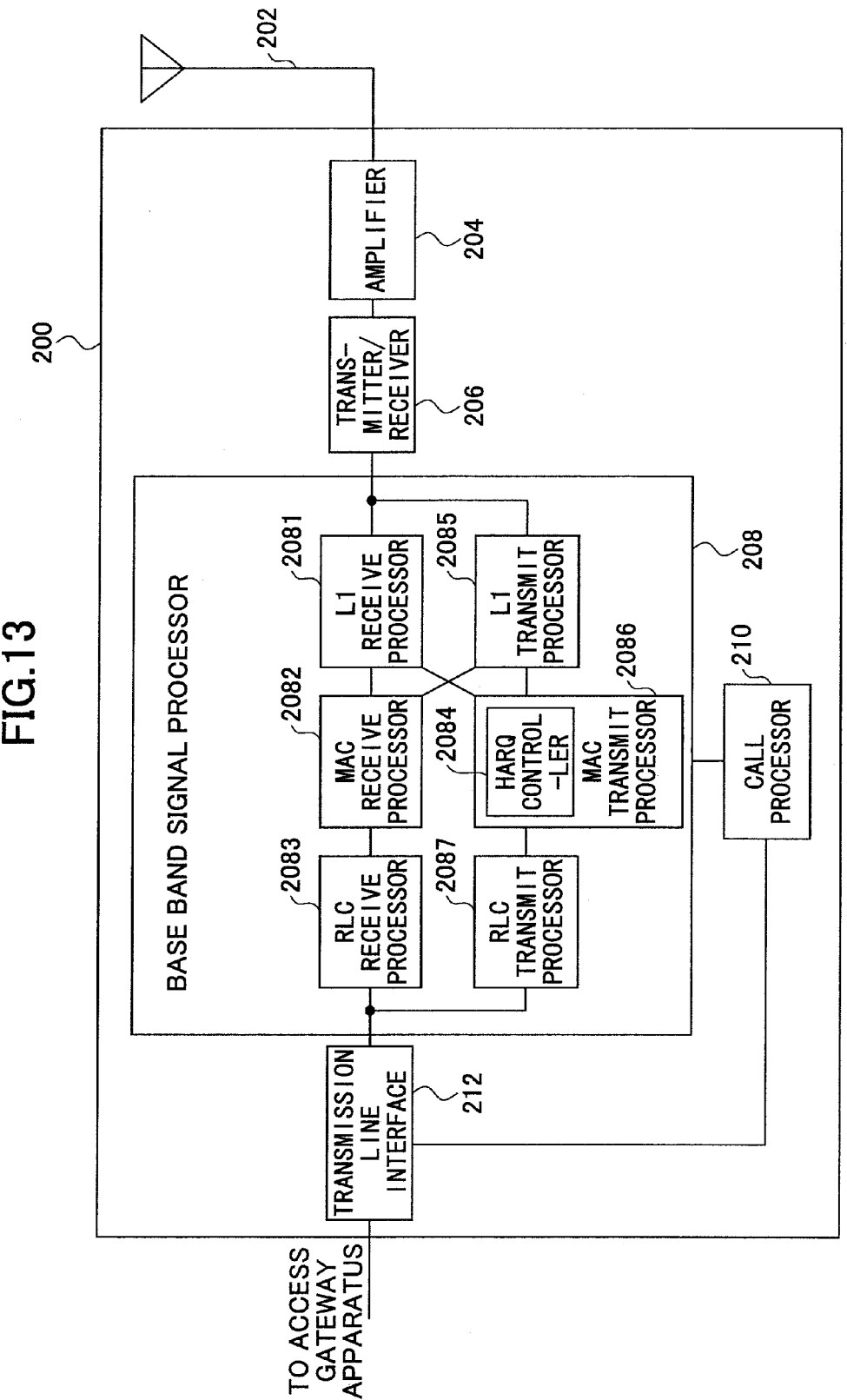
FIG. 13 is a partial block diagram illustrating a base station apparatus according to an embodiment of the present invention.

Then, a base station apparatus 200 according to the present embodiment is described with reference to FIG. 13.

The base station apparatus 200 according to the embodiment of the present invention includes a transmit/receive antenna 202, an amplifier 204, a transmitter/receiver 206, a base band signal processor 208, a call processor 210, and a transmission line interface 212. The base band signal processor 208 includes an L1 receive processor 1081; a MAC receive processor 2082; an RLC receive processor 2083; an L1 transmit processor 2085; and a MAC transmit processor 2086 as first and second transmit units; and an RLC transmit processor 2087. Moreover, the MAC transmit processor 2086 includes a HARQ controller 2084.

User data transmitted from the base station apparatus 200 to the mobile station 100$_n$ in downlink is input from an upper-layer station which is located at a layer upper to the base station apparatus 200 (for example, an access gateway apparatus 300) via a transmission line interface 212 to the base band signal processor 208.

In the RLC transmit processor 2087, RLC layer transmission processes such as user data segmentation/concatenation and RLC (radio link control) retransmission control transmission processes are performed. In the RLC transmit processor 2087, a PDCP layer process as well as the RLC layer transmission processes may be performed. Moreover, in the MAC transmit processor 2086, MAC (Medium Access Control) retransmission control, e.g., a HARQ (hybrid automatic repeat request) transmission process, scheduling, transmission format selection, channel encoding, and inverse Fourier transform (IFFT) processes are performed. In the L1 transmission processor 2085, the inverse fast Fourier transformed transmit data are transferred to the transmitter/receiver 206. Moreover, a signal for a physical downlink control channel which is a downlink control channel also undergoes transmission processes such as channel encoding and inverse fast Fourier transform and then is transferred to the transmitter/receiver 206.

The transmitter/receiver 206 applies a frequency conversion process in which a base band signal output from the base band signal processor 208 is converted to a radio frequency band, after which the converted signal is amplified at the amplifier 204, which amplified signal is transmitted from the transmit/receive antenna 202.

On the other hand, for data transmitted from the mobile station apparatus 100$_n$ to the base station apparatus 200 in uplink, a radio frequency signal received at the transmit/receive antenna 202 is amplified at the amplifier 204, which amplified signal is frequency converted to a base band signal, which is input to the base band signal processor 208.

The L1 receive processor 2081 performs an FFT process, an IDFT process, and an error correcting decoding process on user data included in the input base band signal. The MAC receive processor 2082 performs the MAC retransmission control receive process. The RLC receive processor 2083 performs the RLC layer receive process. In the RLC receive processor 2083, the PDCP layer receive process as well as the RLC layer receive process may be performed. An output signal of the RLC receive processor 2083 is transferred to the access gateway apparatus 300 via the transmission line interface 212. Then, the L1 receive processor 2081 demodulates and decodes acknowledgement information and CQIs that are mapped to the physical uplink control channel transmitted uplink, and reports the decoded results to the MAC receive processor 2082 and the MAC transmit processor 2086.

The processing in the base station apparatus 200 that is for the HARQ processing of user data to which persistent scheduling is applied, according to the present invention that has been described with reference to FIGS. 7 to 11, is performed in the base band signal processor 208 in FIG. 13.

Below, an explanation is given for the L1 receive processor 2081, the MAC receive processor 2082, the RLC receive processor 2083, the HARQ controller 2084, the L1 transmit processor 2085, the MAC transmit processor 2086, and the RLC transmit processor 2087 that are within the base band signal processor 208.

The present invention is related to persistent scheduling in downlink. Thus, only portions related to persistent scheduling in downlink are described, and the other portions are omitted.

The L1 transmit processor 2085 performs channel encoding, IFFT processing, etc., at a transmit timing (sub-frame #i+2 in FIGS. 10 and 11) of initial transmission user data to which persistent scheduling is applied, on the user data to which persistent scheduling is applied. Moreover, in case of a NACK, or acknowledgement information to the initial transmission user data being a negative acknowledgement, the channel encoding, IFFT processing, etc., are performed on the retransmission data at predetermined timings (sub-frame #i+10 in FIG. 10 and sub-frames #i+10, #i+11, and #i+12 in FIG. 11) from transmission of user data to which initial persistent scheduling is applied. In this case, channel encoding is also performed on downlink scheduling information which accompanies user data retransmitted. In other words, a transmit process is performed on user data retransmitted and downlink scheduling information. The acknowledgement information is received from the HARQ controller 2084 within the MAC transmit processor 2086.

When user data to which persistent scheduling is applied are not successfully received at the mobile station apparatus $100_n$, or in other words when a negative acknowledgement (NACK) is received from the mobile station $100_n$ as acknowledgement information, the MAC transmit processor 2086 generates, at predetermined timings (a sub-frame #i+10 in FIG. 10 and sub-frames #i+10, #i+11, and #i+12 in FIG. 11), user data retransmitted and downlink scheduling information mapped to a downlink control channel as a control signal for retransmitting user data to which persistent scheduling is applied. The control of HARQ based on acknowledgement information is performed at the HARQ controller 2084. Then, the downlink scheduling information and user data retransmitted are transmitted to the mobile station apparatus $100_n$ via the L1 transmit processor 2085, the transmitter/receiver 206, the amplifier 204, and the antenna 202. The RLC transmit processor 2087 performs the RLC layer transmit process.

The L1 receive processor 2081 receives, from a mobile station apparatus $100_n$, acknowledgement information for user data to which persistent scheduling is applied that is transmitted in downlink. The L1 receive processor 2081 reports the acknowledgement information to the HARQ controller 2084 within the MAC transmit processor 2086.

Here, the predetermined timing (sub-frame #i+20 in FIG. 10 and sub-frames #i+10, #i+11, and #i+12 in FIG. 11) may be, for example, as described with reference to FIGS. 7 through 11, a synchronous HARQ retransmit timing, or a certain range of retransmit timings that is after a minimum retransmit time interval.

The MAC transmit processor 2086 performs MAC retransmission control, e.g., other than the HARQ transmit process, the persistent scheduling process, the transmission format selection process, the frequency resource allocation process, etc., on user data to which persistent scheduling is applied that is transmitted in downlink as described above. Here, the persistent scheduling process means a process for selecting a mobile station which receives user data using a shared channel in downlink by the sub-frame. Moreover, the transmission format selection process refers to a process for determining modulation scheme, encoding rate, and data size for user data received by the mobile station selected in scheduling. Furthermore, the frequency resource allocation process refers to a process for determining a resource block used for user data received by the mobile station selected in scheduling.

The process in the base station apparatus 200 that pertains to the HARQ process of user data to which persistent scheduling is applied, according to the present invention that has been described with reference to FIGS. 7 to 11, is performed in the L1 transmit processor 2085 and MAC transmit processor 2086 in FIG. 13. In other words, the L1 transmit processor 2085 and MAC transmit processor 2086 transmit, at a predetermined transmit timing of user data to which persistent scheduling is applied, user data to which persistent scheduling is applied after encoding and modulating. Then, when user data to which persistent scheduling is applied are not successfully received at the mobile station $100_n$, based on the decoded results at the mobile station apparatus $100_n$ of user data to which the persistent scheduling is applied, user data retransmitted and downlink scheduling information mapped to a downlink control channel as a control signal for retransmitting user data to which persistent scheduling is applied are generated and transmitted to the mobile station $100_n$. Moreover, the L1 receive processor 2081 and HARQ controller 2084 receive acknowledgement information (ACK/NACK) for user data to which persistent scheduling is applied that are retransmitted.

The call processor 210 performs call processes such as communications channel setting and releasing, status control of the base station apparatus 200, and radio resource control.

Figure 14:
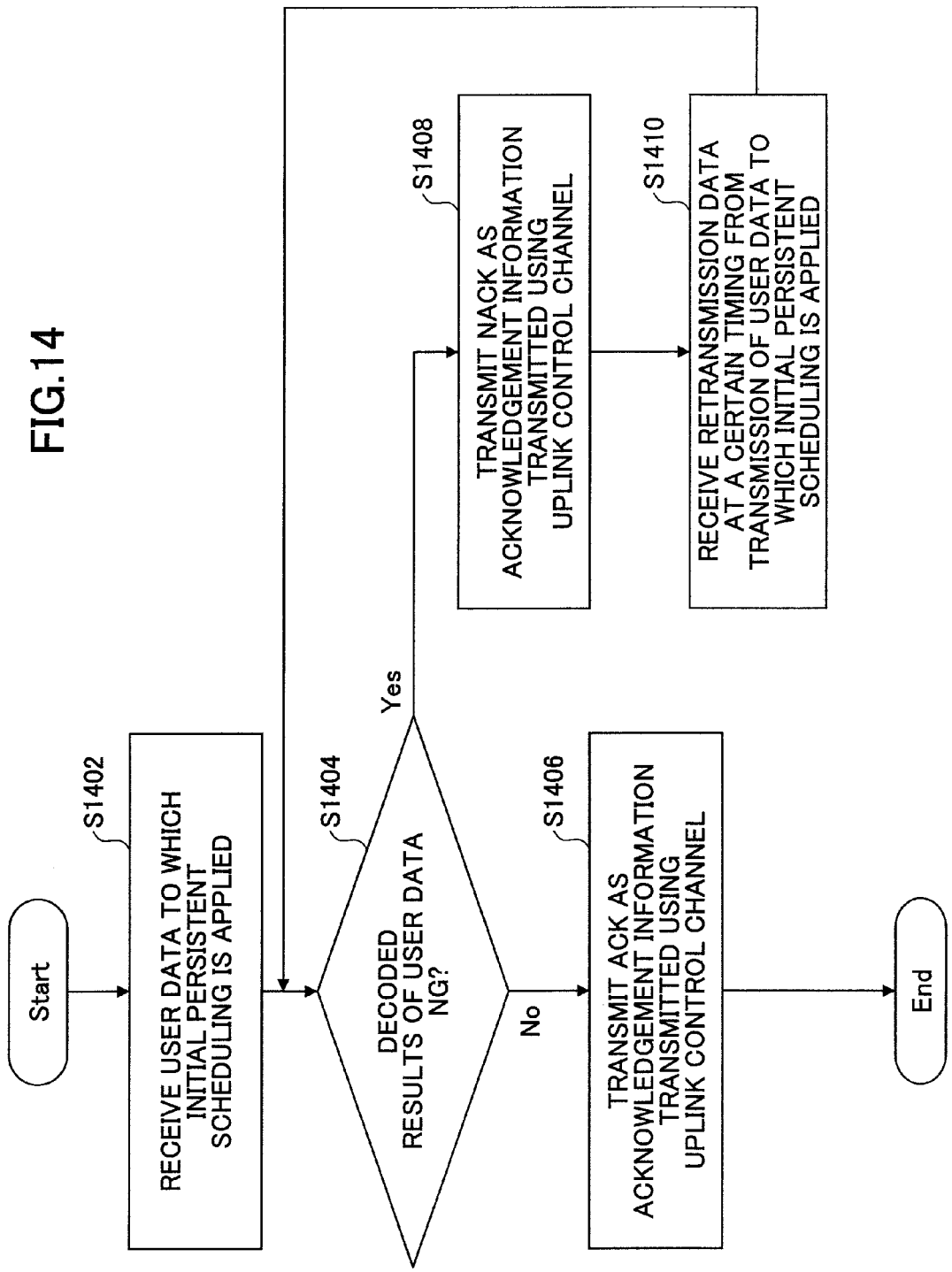
FIG. 14 is a flow diagram illustrating a process in a mobile station apparatus according to an embodiment of the present invention.

A method of controlling communications used at the mobile station apparatus according to the present invention is explained with reference to FIG. 14.

At the receive timing (sub-frame #i+2 in FIGS. 10 and 11) of user data to which predetermined persistent scheduling is applied, the mobile station apparatus 200 attempts receiving user data to which initial transmission persistent scheduling is applied that are transmitted from the base station 200 (step S1402), and determines whether the decoded results are NG (step S1404).

When the decoded result of user data to which initial transmission persistent scheduling is applied is NG (step S1404: YES), NACK is transmitted as acknowledgement information transmitted using an uplink control channel (step S1408).

Retransmission data are received at predetermined timings (sub-frame #i+10 in FIG. 10 and sub-frames #i+10, #i+11, and #i+12 in FIG. 11) from transmission of user data to which initial persistent scheduling is applied (step S1410). Then, the process returns to step S1404.

On the other hand, when the decoded result of user data to which initial transmission persistent scheduling is applied is not NG (step S1404: NO), ACK is transmitted as acknowledgement information transmitted using an uplink control channel (step S1406).

A method of controlling communications that is applied to the base station apparatus 200 according to the present embodiments is explained with reference to FIG. 15.

The base station apparatus 200 transmits, to the mobile station apparatus $100_n$, user data to which persistent scheduling is applied, at a transmit timing (sub-frame #i+2) of user data to which predetermined persistent scheduling is applied (step S1502).

The base station apparatus 200 receives an uplink control channel from the mobile station $100_n$ and determines whether NACK is received as acknowledgement information (ACK/NACK) included in the uplink control channel (step S1504).

When the NACK is not received, in other words, when the ACK is received (step S1504: NO), the process is terminated.

When the NACK is received (step S1504: YES), the base station apparatus 200 transmits retransmission data at a predetermined timing from transmission of user data to which initial persistent scheduling is applied (step S1506). For example, the base station apparatus 200 transmits retransmission user data as well as downlink scheduling information for retransmitting user data to which persistent scheduling is applied that is transmitted in step S1502.

The base station apparatus 200 receives an uplink control channel from the mobile station 100$_n$ and determines whether NACK is received as acknowledgement information (ACK/NACK) included in the uplink control channel.

When the NACK is received (step S1508: YES), the process returns to step S1506. On the other hand, when the NACK is not received, in other words, when what is received is an ACK (step S1508: NO), the process is terminated.

In the above-described embodiments, examples are explained in a system to which Evolved UTRA and UTRAN (otherwise called long term evolution, or Super 3G), the mobile stations, base station apparatuses, mobile communications systems, and communications control methods are also applicable to other systems using shared channels to communicate.

For convenience of explanations, specific numerical value examples are used to facilitate understanding of the present invention. However, unless otherwise specified, such numerical values are merely exemplary, so that any appropriate value may be used.

As described above, while the present invention is described with reference to specific embodiments, the embodiments are merely examples, so that a skilled person will understand variations, modifications, alternatives, replacements, etc. For convenience of explanations, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-211589 filed on Aug. 14, 2007, the entire contents of which are hereby incorporated by reference.

The invention claimed is:

1. A base station of a radio communications system including a mobile station and the base station configured to communicate with the mobile station, wherein the base station applies a scheduling method to the mobile station, wherein the scheduling method is such that a radio resource is allocated to the mobile station at every constant time period, the base station comprising:
 a first transmitter configured to perform a first transmission of a first signal at the every constant time period based on the scheduling method; and
 a second transmitter configured to perform second and subsequent transmissions of the first signal at a predetermined timing when an error occurs in the first transmission,
 wherein the predetermined timing corresponds to an interval having a predetermined length in a unit of a subframe, wherein a starting point of the predetermined timing is a second time point at which a HARQ round trip time (RTT) has elapsed from a first timing of the first transmission,
 wherein the predetermined length is represented by a DRX retransmission timer,
 wherein, when a HARQ RTT timer is expired and when the first transmission of the first signal is not correctly decoded, the DRX retransmission timer is activated, and
 wherein, when the DRX retransmission timer is activated, the second transmitter performs the second transmission of the first signal.

2. A mobile station of a radio communications system including the mobile station and a base station configured to communicate with the mobile station, wherein the base station applies a scheduling method to the mobile station, wherein the scheduling method is such that a radio resource is allocated to the mobile station at every constant time period, the mobile station comprising:
 a first receiver configured to receive a first signal, wherein the first signal is transmitted at the every constant time period based on the scheduling method; and
 a second receiver configured to receive the first signal, wherein second and subsequent transmissions of the first signal are performed at a predetermined timing when an error occurs in the first signal,
 wherein the predetermined timing corresponds to an interval having a predetermined length in a unit of a subframe, wherein a starting point of the predetermined timing is a second time point at which a HARQ round trip time (RTT) has elapsed from a first timing of the first transmission of the first signal,
 wherein the predetermined length is represented by a DRX retransmission timer,
 wherein, when a HARQ RTT timer is expired and when the first transmission of the first signal is not correctly decoded, the DRX retransmission timer is activated, and
 wherein, when the DRX retransmission timer is activated, the second transmitter performs the second transmission of the first signal.

3. A method of controlling communications of a radio communications system including a mobile station, and a base station configured to communicate with the mobile station, wherein the base station applies a scheduling method to the mobile station, wherein the scheduling method is such that a radio resource is allocated to the mobile station at every constant time period, the method comprising:
 a first transmission step, by the base station, of performing a first transmission of a first signal at the every constant time period based on the scheduling method;
 a first reception step, by the mobile station, of receiving the first signal, wherein the first signal is transmitted at the every constant time period based on the scheduling method;
 a second transmission step, by the base station, of performing second and subsequent transmissions of the first signal at a predetermined timing when an error occurs in the first transmissions; and
 a second reception step, by the mobile station, of receiving the first signal, wherein the first signal is transmitted in the second and subsequent transmissions at the predetermined timing when the error occurs in the first signal,
 wherein the predetermined timing corresponds to an interval having a predetermined length in a unit of a subframe, wherein a starting point of the predetermined timing is a second time point at which a HARQ round trip time (RTT) has elapsed from a first timing of the first transmission,
 wherein the predetermined length is represented by a DRX retransmission timer,
 wherein, when a HARQ RTT timer is expired and when the first transmission of the first signal is not correctly decoded, the DRX retransmission timer is activated, and wherein, when the DRX retransmission timer is activated, the second transmitter performs the second transmission of the first signal.

\* \* \* \* \*